United States Patent [19]

Blank

[11] Patent Number: 5,565,531
[45] Date of Patent: Oct. 15, 1996

[54] ACID ETCH RESISTANT AUTOMOTIVE TOPCOAT

[75] Inventor: Werner J. Blank, Wilton, Conn.

[73] Assignee: King Industries, Inc., Norwalk, Conn.

[21] Appl. No.: 250,558

[22] Filed: May 27, 1994

[51] Int. Cl.$^6$ .................................................. C08F 283/02
[52] U.S. Cl. ........................ 525/456; 325/509; 325/452; 325/461
[58] Field of Search ................................. 525/456, 509, 525/452, 461

[56] References Cited

U.S. PATENT DOCUMENTS 4,631,320  12/1986  Parekh et al. ........................... 525/452
5,134,205   7/1992  Blank ....................................... 525/509

*Primary Examiner*—W. Robinson H. Clark
*Attorney, Agent, or Firm*—Morgan & Finnegan, L.L.P.

[57] ABSTRACT

The present invention relates to improved acid etch resistant polymers and coatings, and their method of preparation whereby polyurethane polyols, which because of long alkyl side chains that include a single ether group in the chain, when reacted with a melamine compound, such as, hexakismethoxymethylmelamine, form coatings that have excellent solubility in hydrophobic solvents and provide films with excellent acid etch resistance. The polymers, because of their excellent acid etch resistance and exterior durability can be used for automotive clear coats or single coats.

12 Claims, 3 Drawing Sheets

ACID ETCH RESISTANT AUTOMOTIVE TOPCOAT

FIELD OF THE INVENTION

This present invention relates to chemically resistant polymers that have excellent acid etch resistance and exterior durability and can be used for automotive clear coats or single coats. Specifically, the present invention relates to polyurethanes that are melamine cross-linked to provide polymer coatings with improved acid etch resistance.

BACKGROUND OF THE INVENTION

Polymeric materials have been used for coating substrates in many industries. For example, in the automotive industry, these polymeric coatings, e.g., single coats or clear coats, are used to provide resistance to environmental acids for automotive products. Automotive topcoats represent one of the most demanding coating applications. These have to provide an aesthetic, long lasting appearance, and retain their gloss under the influence of moisture, UV radiation and temperature. Further, due to the acidity of rain, these automotive coatings must also be acid etch resistant.

To avoid environmental pollution and improve safety, reduced volatile organic solvent content (VOC), high solids content (HSC) automotive clear coats have been developed. The HSC coatings are predominantly based upon acrylic polymers. Over the past 10 years, the average molecular weights of the acrylic polymers have been lowered to achieve higher solids content and lower VOC, and the low molecular weight acrylic resins are cross-linked with an amino formaldehyde resin. As the molecular weight of the acrylic polymers is lowered, a higher level of the melamine cross-linker is required to achieve acceptable properties.

For example, the lower solids acrylic polymers which were previously used in automotive coatings contained about 20–25% melamine resin. At this level of melamine resin the acid etch resistance of the coating was acceptable. However, for high solids coatings, a melamine resin level of 30–45% was required to achieve sufficient crosslinking in a lower molecular weight resin, to provide solvent resistance and exterior durability. For a high molecular weight acrylic polymer with a molecular weight ("MW") of 100,000, a film with excellent mechanical properties will form without the need of a crosslinker. Thus, if the MW of a polymer is low, the polymer chain will need to be extended by adding a chain extension agent, i.e. a crosslinker. A further complication arises when the MW of a polymer is decreased. For example, acrylic polymer prepared by free radical polymerization have a random MW distribution. For a polymer with an average MW of 2000, there are high and low MW fractions. The low MW fractions are of concern. It is known that only a fraction of the monomer units contain functional groups such as hydroxyl groups, for chain extension. If 20% of the monomer units are functional and reactive with the melamine resins and a polymer chain contains only 5 monomer units, there will be on the average only one functional group per chain. Also, a certain proportion of the polymer chains will contain no functional groups. It has been found by experience that polymer chains without functional groups plasticize with a resultant decrease in exterior durability. Therefore, to assure the presence of sufficient functional groups on the low molecular weight polymer chains in a high solids acrylic polymer, the content of functional monomer has to be increased. As a result of this increase in the content of functional monomers, the content of the crosslinker must also be increased.

It has been found, however, that at higher levels of the melamine crosslinker the acid etch resistance of the polymer is reduced. Acid etch testing conducted on melamine resins crosslinked coatings show a clear relationship between acid etch resistance and melamine resin content. It is known that the ether linkage between the melamine resins and the acrylic polymer is acid catalyzed and, therefore, will hydrolyze under acid conditions. In contrast, the acrylic backbone itself consisting of carbon—carbon bonds is more resistant to acid attack.

The presently used HSC automotive coatings utilize hydroxyl function acrylic polymers having molecular weights of about 2000–5000 and a hydroxyl number of 150 to 200. Such high solid content acrylic polymers are commercially available, e.g., Acryloid QR-1120 available from Rohmand Haas or, Elveron 100 from Dupont. The melamine cross-linker is usually a fully alkylated hexamethylol melamine resin, such as, hexakismethoxymethylmelamine (HMMM), the oligomers thereof or a mixed ether melamine resin such as a methylated/butylated resin.

The composition of a typical mixed ether melamine resin is described in U.S. Pat. No. 4,374,164. The chemistry and reactivity of melamine resin is described in W. J. Blank, "Reaction Mechanism of Amino Resins," *J. Coat. Techn.*, Vol. 51, No. 6567, pg. 61–70 September 1979; N. Albrecht and W. J. Blank, "The Use of Triazine Resins in High Solids Coatings", *Proceedings of the Sixth International Conference in Organic Coatings and Technology*, Athens, Greece, 1980; W. J. Blank, "Amino Resins in High Solids Coatings," *J. Coat. Techn.* Vol. 54; Nu 687; pg 26–41. The attack by acids on automotive coating is described in Alrich Schulz & Peter Trubiroha, "Simulated acid precipitations, Advances in the weathering of automotive finishes", *Europcoat* 9/1993, Pg 600–602. Formulations prepared from hydroxyl function acrylic polymers and HMMM are catalyzed with a strong sulfonic acid catalyst such as p-toluenesulfonic acid or dodecylbenzene sulfonic acid, dinonylnaphthalene disulfonic acid or the amine salts of these acids.

It has now been found that the low molecular weight acrylic/cross-linked melamine coatings of the prior art are sensitive to acid rain. As a result, when these HSC coatings are applied to surfaces that are exposed to typical industrial conditions, such as acid rain found in an industrial environment, the acid attacks the surface of the HSC coating. The acid rain causes leaching of the slightly basic melamine resins leading to a dull surface with the loss of gloss and eventually, pitting.

Two component acrylic/isocyanate coatings have been developed in an attempt to avoid this problem. However, because of the toxicity of the isocyanates and the short pot life of these coatings, they have not been accepted widely by the coating industry.

Thus, the objective of the present invention is to provide a polymeric coating that avoids the above mentioned problems. This objective have been achieved by polyurethane-polyol-melamine cross-linked polymers and coatings according to the present invention that have improved acid etch resistance.

THE PRIOR ART

The instant applicants are aware of the following references: John L. Gordon, "Polyurethane Polyols: Ester-Bond Free Resins For High Solids Coatings," *J. of Coating*

Technology, Vol. 65, No. 819, April 1993, Pages 25–33; Werner J. Blank, "Non-Isocyanate Routes To Polyurethanes," *Water-Borne and Higher Solids Coatings Symposium*, Feb. 21–23, 1990, New Orleans, La. and U.S. Pat. Nos. 5,134,205 and 4,820,830.

SUMMARY OF THE INVENTION

The present invention provides improved acid etch resistant coatings that are prepared from polyurethane polyols, which are soluble in conventional solvents such as aromatic hydrocarbons, ketones, esters, glycolethers, glycolether acetates and alcohols. Examples for such solvents are xylene, toluene, methylethylketone, acetone, methylisobutylketone, ethylacetate, butylacetate, 2-methoxypropanol, 2-methoxypropylacetate.

The polyurethane polyols of this invention do not require exotic and expensive solvents such as methypyrrolidinone, dimethylformamide, dimethylacetamide or dimethylsulfoxide. In addition the polyurethane polyol of this invention is broadly compatible with a wide range of melamine formaldehyde resins, including hexakis (methoxymethyl) melamine, partially alkylated melamine formaldehyde resins, butylated melamine formaldehyde resins, alkylated glycoluril formaldehyde resins and with most amino formaldehyde resins. Melamine formaldehyde resins are preferred because of their excellent combination of properties and cost.

It is an object of the present invention to provide a polyurethane polymer having an average molecular weight of from about 500 to about 5000 and prepared from at least one monomer having at least one hydrophobic side chain per molecule that contains one ether group per chain.

It is a further object of the subject invention to provide a process of preparing polyurethane polyol polymers by reacting a diol or at least one polyol with a poly(hydroxyalkyl carbamate) of an aliphatic or cycloaliphatic amine and a monohydroxyalkyl carbamate of an alkoxypropylamine or an alkoxypropylamine to form a polyurethane polyol and reacting the polyurethane polyol and a melamine crosslinker with a catalyst to form the improved acid etch resistant coating.

It is still another object of the present invention to improve the acid etch resistance of polyurethane polymers by using a polyol having an ether group in the hydrophobic side chain.

It is a further objective of this invention to render these polyurethane polyols water-dispersible by reacting these polyols with an anhydride, to form a half ester of said anhydride, and dispersing this half ester in water in the presence of a volatile base, such as an amine.

In order that the concepts of the present invention may be more fully understood, the following drawings and examples are set forth in which all parts are by weight unless otherwise indicated. These examples are set forth primarily for illustration and any specific enumeration of detail set forth therein should not be interpreted as a limitation on the case except as is indicated in the appended claims.

DETAILED DESCRIPTION OF THE PREFERRED EMBODIMENTS

Figure 1:
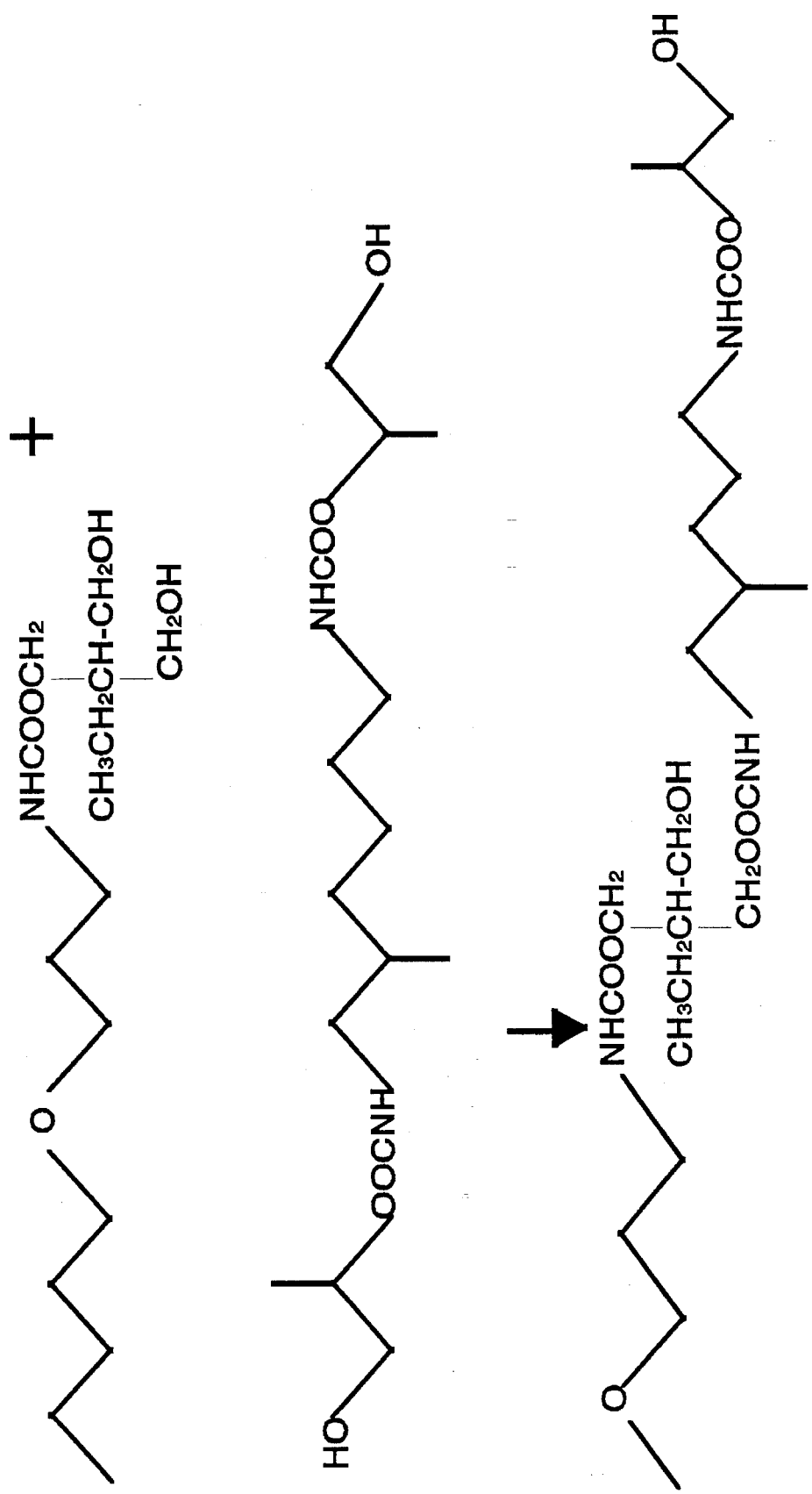
FIG. 1 shows the reaction product of a, trimethylolpropane (TMP) with a reaction product of an etheramine and a cyclic carbonate.

The present invention involves coatings prepared from polyurethane polyols, which are soluble in conventional solvents such as xylene, and have substantially improved acid etch resistance. The improved acid etch resistant polymers can be applied as a coating to metallic or primed substrates, such as steel or electrocoated steel, to provide a bright surface with high gloss that resists dulling and pitting from acid rain and/or harsh environments.

Conventional urethane polymers known in the art are polyester or polyether urethanes. The polymers are normally obtained by reacting a polyester or polyether polyol with a diisocyanate or by nonisocyanate routes such as a condensation reaction of a carbonate and a diamine, followed by condensing the dicarbamate with a diol. See W. J. Blank, Preprint, *Water-Borne and Higher Solids Coatings Non-Isocyanate Routes to Polyurethanes.* Symposium at University of Southern Mississippi (February 1990).

Although these urethane coatings have excellent flexibility and abrasion resistance, they do not provide any improvement in acid etch resistance despite the replacement of the ester groups with urethane groups which are more resistant to acid hydrolysis. Moreover, it has been found that polymers containing only urethane groups have poor solubility in conventional, low polar solvents such as, xylene and toluene. This poor solubility renders the urethane polymers unacceptable in automotive coating.

It is also known from alkyd resin synthesis that long oil alkyds have improved solubility versus short oil alkyds or polyester resins. Long oil alkyds or short oil alkyds refer to the amount (weight) of fatty acid in the polymer. The fatty acids used in alkyds have normally a chain length of 12 to 18. A short oil alkyd has a fatty acid content of approximately 30–50% and a long oil alkyd of 60–75%. There have been attempts to improve the solubility of polyurethane resins in solvents typically used in the automotive industry. However, though the solubility in xylene at higher temperature was improved, the resulting solutions turn hazy, gel and eventually crystallize at room temperature. Therefore, introducing long alkyl side chains results in an unacceptable source material for automotive coatings. Accordingly, their commercial use of such polyurethane resins is quite limited.

It has been found unexpectedly that the presence of an ether group in the long alkyl side chain introduced to a polyurethane polyol overcomes these disadvantages, such as hazing, gelling and crystallizing. It further provides polyurethane polyols with excellent solubility in hydrophobic solvents. Further, films formed from such polyurethane polyol resins have excellent acid etch resistance.

The polymer according to the present invention is defined by the formula

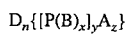

wherein D is OH group, a carboxyalkylester or a carboxyarylester obtained by the reaction of an OH group with a $C_4$ to $C_{20}$ acyclic aliphatic, a $C_4$ to $C_{20}$ cycloaliphatic or a $C_8$ aromatic anhydride group, or a combination of an OH group and the above carboxyalkyester or carboxyarylester groups;

n is at least 2, preferably 3 or higher, with a maximum average of about 10;

P is a $C_2$-$C_{10}$ aliphatic or $C_3$-$C_{10}$ cycloaliphatic moiety and is derived from a diol or polyol;

B is a di or tri functional aliphatic or cycloaliphatic urethane and or urea moiety with the structure

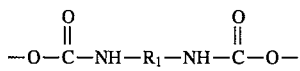

wherein $R_1$ is $C_2$ to $C_{18}$, or

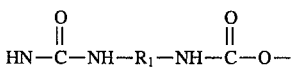

wherein $R_1$ is $C_2$ to $C_{18}$, or

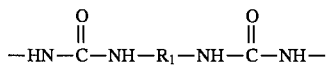

wherein $R_1$ is $C_2$ to $C_{18}$; and derived from the reaction with a polyhydroxyalkyl carbamate A is defined as,

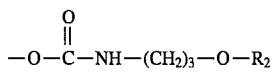

wherein $R_2$ is a $C_6$ to $C_{18}$ aliphatic linear or branched alkyl group derived from the reaction product of an amine with a cyclic carbonate, or

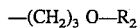

wherein $R_2$ is a $C_6$ to $C_{18}$ aliphatic linear or branched alkyl group derived from an etheramine, and optionally at least a portion of the above etheramine can be replaced with A' defined as

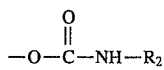

with $R_2$ being a $C_6$ to $C_{18}$ aliphatic linear or branched alkyl group derived from the reaction product of an amine and a cyclic carbonate, or a $C_6$ to $C_{18}$ aliphatic linear or branched alkyl group derived from an amine; and z is on the average at least one.

According to the present invention, polyurethane polyols are prepared by reacting a diol or polyol or a combination of polyols with (1) a poly(hydroxyalkyl carbamate) of an aliphatic or cycloaliphatic amine and/or (2) a monohydroxyalkyl carbamate of an alkoxyalkylamine. Optionally some of the alkoxyalkyl amine can be replaced by an alkylamine.

The polyol contains, on the average, at least one hydrophobic side chain per molecule. At least a part of the side chain contains one ether group per chain. The average hydroxyl functionality of these polyurethanes is at least 2, preferably 2.5 or higher. The average molecular weight of above polymer is between 500 and 5000, preferably between 800 and 3000, and most preferably between 1000 and 2000. If the polymer is to be water-dispersible, the carboxyl content should be between 0.5 to approximately 1.5 MEQ/g of polymer, preferably between 0.8 to 1.2 COOH MEQ/g (milliequivalent per gram). Preferably, the polymer should have on the average of one carboxyl group per chain.

The polyurethane according to the present invention are soluble in aromatic hydrocarbons, ketones, esters or alcohols. The polyurethane polyols of the present invention are essentially devoid of ester groups, but can contain, besides the urethane groups, urea groups.

The preferred method of preparing the polyurethane polyol is by condensing a bis(β-hydroxyalkyl carbamate) of a linear aliphatic or cycloaliphatic diamine with a polyol or a β-hydroxyalkyl carbamate of a $C_6$-$C_{30}$ monoamine containing one ether group per chain with a polyol. Optionally, if urea groups are desired, parts of the β-hydroxyalkyl carbamate monomers can be replaced with a free diamine or monoamine. The β-hydroxyalkyl carbamates used in the present invention can be prepared by the reaction of a cyclic carbonate with a primary diamine or mono amine as shown below:

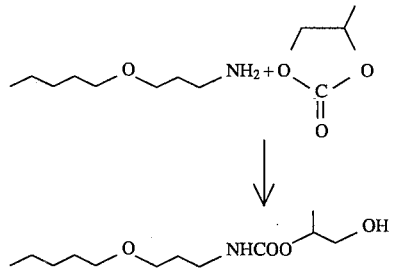

and disclosed in U.S. Pat. Nos. 4,820,830 and 5,134,205 the subject matter of which is incorporated herein by references. The cyclic carbonates used in the present invention are defined in the above referenced patents.

The diamines that can be used in the present invention include (1) $C_2$-$C_{12}$ linear alkyl diamines, (2) $C_5$-$C_{15}$ cycloaliphatic amines and combination of linear amines, as well as the diamines disclosed in U.S. Pat. Nos. 4,820,830 and 5,134,205. Amines other than those identified above can also be used. The preferred amines used are the branched chain amines disclosed in U.S. Pat. No. 4,820,830.

Examples of other amines which are useful in the present invention includes alkyl diamines such as: ethylenediamine, 1,3-propane diamine, 1,4-butane diamine, 1,5-pentane diamine, 1,6-hexane-diamine, 1,7-heptane diamine, 1,8-octane diamine, 1,9-nonane diamine, 1,10-decane diamine, 1-12-dodecane diamine and the branched chain analogs of said amines, such as 2,2,4-trimethyl hexamethylene diamine, 2,4,4-trimethyl hexamethylene diamine; cycloaliphatic amines such as 1,2-cyclohexane diamine, 1,4-cyclohexane diamine, 1,3-cyclohexane diamine, 3-aminomethyl-3,5,5-trimethyl-cyclohexylamine, 4,4-diaminodicyclo hexylmethane, 3,3-dimethyl-4,4-diaminodicyclohexylmethane; isodecyloxypropyldiaminopropane; alkoxyproplyamines such as: isohexyloxypropylamine, isodecyloxypropylamine, isotridecyloxypropylamine, hexyloxypropylamine, decyloxypropylamine, tridecyloxypropylamine. Typical anhydrides which can be used to render the polyurethanes water-soluble or dispersible are: succinic anhydride; glutaric anhydride; phthalic anhydride; hexahydrophthalic anhydride; tetra hydrophthalic anhydride; methylhexahydrophthalic anhydride; substituted succinic anhydrides such as alkylenesuccinic anhydrides: octenylsuccinic anhydride, tetradecenylsuccinic anhydride, octadecenylsuccinic anhydride, 5-norbornene-2,3-dicarboxylic anhydride, and maleic anhydride.

The monoamines used in this invention are the linear or branched aliphatic alkoxypropylamines or alkoxyethylamines with a total carbon content per chain of between 6 to 30 carbon atoms. Preferred are the monoamines with a chain length of between 9 to 20 carbon atoms.

Typical polyols that are used in the present invention include for example, trimethylolpropane, trimethylolethane, pentaerythritol, glycerine, but are not limited thereto.

An exemplary condensation reaction between a β-hydroxalkyl carbamate and trimethylolpropane is shown below:

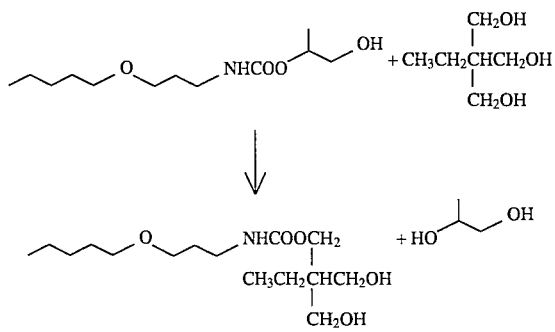

The condensation reaction is conducted at a temperature of between about 120° C. and about 200° C., preferably between about 150° C. and about 180° C. The reaction is conducted under nitrogen or under a vacuum to facilitate the removal of glycol from the reaction of the β-hydroxyalkyl carbamate with the polyol or from self-condensation.

The self-condensation of a β-hydroxyalkylcarbamate or the reaction with a hydroxyl group require the presence of a catalyst. Examples of suitable catalysts are strong bases such as the hydroxide of the alkali and earth alkali metals, transesterification catalysts such as the dialkyltin oxides, acetates, or laurates, zinc and lead salts. This is an illustrative list of the suitable catalysts and is by no means comprehensive. The catalyst is usually present in a concentration of approximately 100 ppm to 10000 ppm. For the condensation reaction to proceed it is essential that glycol such as the propylene glycol formed from the reaction of β-hydroxypropyl carbamate with a hydroxyl group is removed by distillation, either by vacuum or by using an azeotropic solvent. A suitable vacuum is between 0–400 mmHg. Azeotropic solvents suitable for the removal of 1,2-propylene glycol are aliphatic and aromatic hydrocarbons. The endpoint of the reaction can be measured by determining the molecular weight by gel phase chromatography, viscosity, hydroxyl number or by a combination of these methods.

In addition, solubility tests with hydrophobic solvents can be used to determine the extent of the reaction. To achieve water-dispersibility, a portion of the hydroxyl groups of the polyurethane polyol is reacted with an anhydride usually in the melt or in the presence of an aprotic solvent. To achieve the formation of the half ester of the anhydride and the urethane polyol a reaction temperature of 50°–150° C. is used, preferably between 80°–130° C. The reaction time is 30 to 180 minutes, preferably between 60–120 minutes. The course of the reaction can by followed by acid number titration. This reaction is preferably base catalyzed with a t-alkylamine or an inorganic base, although it will also proceed in the absence of a catalyst. The resulting carboxyl and hydroxyl functional polymer is partially or completely neutralized with an amine and dispersed in water. To achieve water-dispersibility a carboxyl content of about 0.5 to 1.5 MEQ/g is required. It is generally desirable to keep the carboxyl content as low as possible to assure optimum in acid resistance properties. A higher acid number means an increase in the ionic charge on the polymer and shows improved solubility of the polymer. It is possible to replace 90–95% of the hydroxyl groups of the polymer with anhydride and achieve an essentially all carboxyl functional polymer. Such a polymer can be crosslinked with both melamine resins and also with epoxy resins. To disperse polyurethane in water, a base such as ammonia or a simple organic amine can be used. Examples for such amines are t-alkylamines and alkanolamines such as triethylamine, trimethylamine, dimethylethanolamine, dimethylpropanolamine, methyldiethanolamine; diisopropanolamine or primary alkyl amines such as ethylamine, propylamine, ethanolamine or propanolamine. These amines may be gaseous at room temperature such as ammonia or they can have a boiling point as high as 250° C. Many of these amines will partially or completely evaporate during cure, some amines such as diisopropanolamine will co-react with the melamine resins and be incorporated into the polymer film. In addition, the reaction of the melamine resin with the carboxyl and hydroxyl groups of the polymer can be catalyzed with a strong acid catalyst such as a sulfonic acid. The carboxyl groups will catalyze the reaction of a polyol with a melamine resin. Temperatures of 150° C. or higher are required for carboxyl groups to catalyze the reaction of a full aklylated melamine resins such as hexamethoxymethylmelamine (HMMM) with a polyol.

Sulfonic acid catalyst can reduce the cure temperature to as low as 80° C. Typical acid catalysts used are well known in the art. These include p-toluene sulfonic acid, xylene sulfonic acids, dodecylbenzene sulfonic acid, dinonylaphthalene di and mono sulfonic acid and the amine and Lewis acid metal salts of these acids. The level of acid catalyst is about 0.2 to 3% on the solids of the coating. A high level of the acid catalyst may impair water resistance and corrosion resistance and are to be avoided.

The coatings an be applied directly onto a metal substrate or onto a primed substrate. In automotive coatings, the metal is usually first alkali cleaned and then pretreated with iron phosphate or zinc phosphate and then electrocoated with a water-borne primer. The coating is baked at high temperatures and then the primer is sprayed with a filler to cover all metal imperfections. Then a base coat which determines the color and appearance of the car is applied. As a final coating, a clear coat is applied. The clear coat is also formulated with additives to improve the UV resistance of the coating, such as a UV absorber or a free radical scavenger such as hindered amine light stabilizer. This coating protects the car from UV radiation, acid rain and the environment. In less demanding applications the coating can be directly applied on the metal.

Acid etch resistance is a critical problem for automotive coatings, because of the high performance requirements of these coatings. Rain in industrial areas may have a pH as low as 4. This low pH is predominantly a result of sulfuric acid and sulfurous acid formed by burning of sulfur containing fuel. Although it is highly diluted the acid becomes concentrated on the surface of the coating in areas may reach a pH as low as 1. This acid attack is especially a problem in area of high sun shine and UV radiation, when the surface of a car can reach temperatures as high as 65° C. To simulate acid attack on exposure many complicated laboratory tests have been developed. Most of these complicated accelerated tests do not completely agree with results shown on actual exposure.

It has been found that a simple spot test with 20% sulfuric acid at different temperatures gives an indication if a polymer coating is resistant to acid rain. This acid spot test is conducted in the laboratory by placing one drop of 20% sulfuric acid on a panel and heating the panel for 15 minutes to a temperature of 50° or 60° or 75° C. For each acid spot test a panel is required. The test procedure can be simplified using a gradient oven. This oven is similar to a hot plate where the temperature is controlled. The different zones of the gradient oven are adjusted to 50°, 60° and 75° C. Three sulfuric acid spots are placed at appropriate positions on the panel. The panels are kept 15 minutes on the gradient oven. The temperatures of the panels are monitored with thermocouples. After exposure, the panels are washed with water and the surfaces are immediately examined. The rating scale is as follows:

0—no visible attack;
1—spot barely visible only in presence of moisture;
2—slight surface haze visible in the absence of solvent, no discoloration;
3—surface hazy, no discoloration;
4—discoloration, surface swollen;
5—Film attacked, partially dissolved.

Besides automotive applications, there are other end uses where coatings with high chemical resistance are desired. These include aerospace coatings, coatings for laboratory instruments.

The invention will now be described with reference to the followings non-limiting, examples.

EXAMPLE 1

Preparation of a Mono β-hydroxyalkyl Carbamate from an Alkoxyalkylamine 216 part by weight (1 mole) of a blend of $C_6$-$C_{10}$ n-alkoxypropylamine with an amine equivalent weight of 216 was charged into a suitable reactor equipped with stirrer, temperature control and nitrogen inlet. The reactor was flushed with nitrogen and 112 parts by weight (1.1 mole) of propylene carbonate was slowly added to the reactor. The reaction was exothermic and the temperature was controlled to below 120° C. The mixture is held at 120° C. for 3 to 5 hours or until the amine content drops to below 0.15 MEQ/g. The resulting monocarbamate material was an amber viscous liquid and had a viscosity of 142 cps at 25° C.

EXAMPLE 2

Preparation of a Polyurethane Polyol 1272 parts by weight (4 moles approximately) of the mono carbamate of Example 1 and 1072 parts by weight (8 moles) of trimethylolpropane were charged into a suitable reactor and heated under nitrogen to 160° C. The solution cleared at about 70° C. At this time 0.1 part by weight of KOH catalyst dissolved in 5 parts of methanol were added. Vacuum was applied and distillation started at about 28.5" of Hg. The temperature was slowly raised to 170° C. and about 317 parts by weight of distillate, 1,2-propylene glycol, were collected. The reaction mixture was cooled to 150° C. and 2550 parts by weight of a bis-hydroxypropyl carbamate of 2-methyl-1,5-pentanediamine were added. The reaction mixture was slowly heated to 175° C. and vacuum was applied. About 460 parts by weight of distillate were collected. The resin produced had an ICI melt viscosity of 4.9 Poise at 75° C. The reaction was continued and an additional 538 parts by weight of distillate were collected. The ICI viscosity of the melt was 5.1 Poise at 100° C. The mixture was cooled to 140° C. and diluted with xylene to a nonvolatile content of 75.5% (60 minutes at 110° C.) and a Brookfield viscosity of 16900 cps at 25° C. The resin had a Gardner color of about 3–4. IR analysis of the distillate shows it to be predominantly 1,2-propylene glycol.

EXAMPLE 3

Preparation of a Polyurethane Polyol 318 parts by weight (1.0 mole) of the monocarbamate of Example 1 was charged to a suitable reactor with 201 parts by weight (1.5 moles) of trimethylol propane. The mixture was heated under a nitrogen blanket to 170° C. Approximately 0.1 part by weight of potassium hydroxide dissolved in 1 part of methanol was added as a catalyst. Vacuum was slowly applied and approximately 110 parts of distillate were collected. In a second reaction step the thus formed alkyl urethane substituted trimethylolpropane was then reacted with 348 parts by weight (1.05 moles) of a bishydroxy-propylcarbamate of 2-methyl-1,5-pentanediamine. The reaction was continued at 160°–170° C. FIG. 1 schematically shows this reaction. Full vacuum was applied and about 179 parts of distillate were collected, which corresponds approximately to a complete reaction of the bishydroxyalkyl carbamate with the remaining hydroxyl groups of the trimethylolpropane. The reaction mixture was cooled to 140° C. and 150 parts by weight of xylene were charged. The resulting resin had a solids content of 78.6% and was completely soluble in xylene. Viscosity of this resin was about 50600 cps at 25° C.

EXAMPLE 4

Comparative Example of Preparing a β-hydroxypropyl Carbamate (Lacking an Ether Substituted Alkyl Side Chain)

A primary alkyl amine was reacted with propylene carbonate to form the β-hydroxypropyl carbamate. 185 parts by weight (1.0 mole) of dodecylamine was reacted with 112 parts of propylene carbonate following the instruction of Example 1. The resulting mono β-hydroxypropyl carbamate had a residual amine content of 0.15 MEQ/g and was solid at room temperature. The melting point was approximately 40°–50° C. and the nonvolatile about 96.6%.

EXAMPLE 5

Comparative Example of Preparing a Polyurethane Polyol 143 parts by weight (0.49 mole) of the β-hydroxypropyl carbamate of Example 4 in molten form was charged into a suitable reactor. To the reactor, 134 parts (1 mole) of trimethylolpropane and 486 parts by weight (0.152 mole) of a bishydroxypropyl carbamate of 2-methyl-1,5-pentanediamine were charged. In addition, 0.1 parts by weight of KOH catalyst dissolved in methanol were added. The reaction mixture was heated to 165° C. and vacuum was applied. Reaction products were distilled over. The reaction temperature was slowly raised to 170° C. A total of 215 parts by weight of distillate was collected. The resin melt was cooled to 140° C. and 150 parts of xylene were added. Initially, on dilution with xylene, the resin was soluble in xylene. However, with further addition of xylene and cooling, the resin became insoluble.

EXAMPLE 6

Comparative Example of Preparing a Polyurethane Polyol

Example 2 was repeated in all essential details but the β-hydroxypropyl carbamate of Example 1 was replaced with an equal molar amount of the β-hydroxypropyl carbamate of Example 4. The resulting resin was on completion diluted with xylene. This resin was soluble in hot xylene but started to crystallize on cooling to room temperature.

EXAMPLE 7

Coating formulation Nos. 1 and 2 were prepared with the polyurethane polyol of Example 3 and evaluated in Table 1. As cross-linker, a commercial grade of hexamethoxymethylmelamine (HMMM) (Resimine 747 of Monsanto) was used. The formulation was catalyzed with a commercially available dodecylbenzene sulfonic acid catalyst (NACURE 5076 from King Industries).

TABLE 1

| | FORMULATION # | | | | | | | |
|---|---|---|---|---|---|---|---|---|
| | 1 | | | | 2 | | | |
| | WEIGHT % SOLIDS | CHARGE | | | WEIGHT % SOLIDS | CHARGE | | |
| Polyurethane Example 3 | 79.0 | 122.1 | | | 84.0 | 122.1 | | |
| RESIMINE 747 (HMMM) | 20.0 | 25.8 | | | 15.0 | 18.2 | | |
| NACURE 5076 catalyst | 1.0 | 1.8 | | | 1.0 | 1.7 | | |
| 2-Methoxypropylacetate | | 50.0 | | | | 50.0 | | |
| TOTAL | 100.0 | 199.7 | | | 100.0 | 192.0 | | |
| RESULTS | | | | | | | | |
| SOLIDS % CALC | | 63.4 | | | | 62.0 | | |
| VISCOSITY, CPS, 25° C. | | 357 | | | | 349 | | |
| BONDERITE 1000, iron phosphated cold rolled steel | | | | | | | | |
| CURE SCHED 20 MIN °C. | 100.0 | 110 | 120 | 150 | 100 | 100 | 120 | 150 |
| FILM TH. MIL | 1.0 | 1.0 | 1.0 | 1.0 | 1.0 | 1.0 | 1.0 | 1.0 |
| APPEARANCE | GLOSSY | GLOSSY | GLOSSY | GLOSSY | GLOSSY | GLOSSY | GLOSSY | GLOSSY |
| KNOOP HARDNESS | 4.2 | 9.5 | 11.9 | 15.8 | 1.3 | 2.5 | 3.9 | 6.6 |
| PENCIL HARDNESS | B-HB | HB-F | HB-F | HB-F | 3B-2B | 3B-2B | 2B-B | 2B-B |
| IMPACT DIR IN. LB | 160 | 60–80 | 20–40 | 20–40 | 0–20 | 0–20 | 0–20 | 80–100 |
| REV IN. LB | 160 | 140–160 | 160 | 160 | 160 | 40–60 | 80–100 | 60–80 |
| MEK 2X RUBS | 75 | 200 | 200 | 200 | 30 | 35 | 60 | 180 |
| CONICAL MANDREL ELONGATION, % | 31 | 31 | 2 | 2 | 31 | 31 | 31 | 31 |
| ACID ETCH TEST | | | | | | | | |
| 15' @ 50° C. | | | 1* | | | | 1* | |
| @ 60° C. | | | 2* | | | | 2* | |
| @ 75° C. | | | 3* | | | | 3* | |

*Acid Etch Rating see page 18

EXAMPLE 8

Coating formulation Nos. 3 and 4 were prepared with the polyurethane polyol of Example 3 and evaluated in Table 2. As cross-linker, a commercial grade of hexamethoxymethylmelamine (HMMM) similar to that used in Example 7 was added but at higher levels (Resimine 747 of Monsanto was used). The formulation was catalyzed with a commercially available dodecylbenzene sulfonic acid catalyst (NACURE 5076 from King Industries).

TABLE 2

| | FORMULATION # | | | | | |
|---|---|---|---|---|---|---|
| | 3 | | | 4 | | |
| | WEIGHT % SOLIDS | CHARGE | | WEIGHT % SOLIDS | | CHARGE |
| Polyurethane Example 3 | 74.0 | 122.1 | | 69.0 | | 122.1 |
| RESIMINE 747 HMMM | 25.0 | 34.5 | | 30.0 | | 44.4 |
| NACURE 5076 catalyst | 1.0 | 1.9 | | 1.0 | | 2.1 |
| 2-Methoxypropyl acetate | | 50.0 | | | | 50.0 |
| TOTAL | 100.0 | 208.5 | | 100.0 | | 218.5 |
| RESULTS | | | | | | |
| SOLIDS % CALC | | 63.4 | | | | 66.3 |
| VISCOSITY, CPS, 25° C. | | 382.0 | | | | 407.0 |
| BONDERITE 1000, iron phosphated cold rolled steel | | | | | | |
| CURE SCHED 20 MIN ° C. | 100 | 120 | 150 | 100 | 120 | 150 |
| FILM TH. MIL | 1.0 | 1.0 | 1.0 | 1.0 | 1.0 | 1.0 |
| APPEARANCE | EXCEL | EXCEL | EXCEL | EXCEL | EXCEL | EXCEL |
| KNOOP HARDNESS | 4.2 | 9.5 | 11.9 | 1.3 | 2.5 | 3.9 |
| PENCIL HARDNESS | B-HB | HB-F | HB-F | 3B-2B | 3B-2B | 2B-B |
| IMPACT DIR IN. LB | 160 | 60–80 | 20–40 | 0–20 | 0–20 | 0–20 |
| REV IN. LB | 160 | 140–160 | 160 | 160 | 40–60 | 80-MEK |
| 2X RUBS | 75 | 200 | 200 | 30 | 35 | 60 |
| CONICAL MANDREL ELONGATION, % | 31 | 31 | 2 | 31 | 31 | 31 |
| ACID ETCH TEST 15' @ 50° C. | | | 1* | | | 1* |
| @ 60° C. | | | 2* | | | 2* |
| @ 75° C. | | | 3* | | | 3* |

*Acid Etch Rating see page 18

EXAMPLE 9

Comparative Example Using Acrylic Polymer

As a comparative example for acid etch resistance, a high solids acrylic melamine resin crosslinked coating was prepared. A commercial grade of hexamethoxymethylmelamine (HMMM) (Cymel 303, American Cyanamid Co.) as a cross-linker was used. The formulation was catalyzed with a commercially available dodecylbenzene sulfonic acid catalyst (NACURE 5225 from King Industries). The formulation and evaluation results of Example 9 are shown in Table 3. The acrylic resin was a commercially available resin available from Rohm & Haas with following characteristics: Nonvolatile 84%; solvent n-butylacetate; viscosity, 6000–1000 cps Specific gravity 1.08; hydroxyl number (solids) 155; Acid number (solids) 5. This resin was designed specifically for low VOC high solids chemically resistant coatings. DISLON was a commercially available acrylic flow and leveling agent available from Kusomoto Chemical (Tokyo, Japan).

TABLE 3

| HIGH SOLIDS ACRYLIC/MELAMINE SYSTEM | | |
|---|---|---|
| | WEIGHT % RESIN | CHARGE |
| ACRYLOID QR-1120 | 70.8 | 119.0 |
| CYMEL 303 | 28.2 | 39.9 |
| 2-Methoxyproply acetate | | 20.0 |
| NACURE 5225 | 0.5 | 2.8 |
| DISLON 1985-50 | 0.5 | 1.4 |
| (Flow agent) | | |
| TOTAL | 100.0 | 183.1 |
| RESULTS | | |
| SOLIDS % CALC | | 77.1 |
| VISCOSITY, CPS | | 220 |
| BONDERITE 1000, iron phosphate on cold rolled steel | | |
| CURE SCHED. 20 MIN °C. | 120 | 150 |
| FILM TH. MIL | 0.80 | 0.80 |
| APPEARANCE | GLOSSY | GLOSSY |

TABLE 3-continued

| HIGH SOLIDS ACRYLIC/MELAMINE SYSTEM | | |
|---|---|---|
| | WEIGHT % RESIN | CHARGE |
| KNOOP HARDNESS | 10.30 | 13.50 |
| PENCIL HARDNESS | HB-F | H-2H |
| IMPACT DIR IN. LB | 60–80 | 60–80 |
| REV IN. LB | 0–20 | 0–20 |
| CROSSHATCH ADH. % | 100 | 100 |
| MEK 2X RUES | 140 | 200 |
| CONICAL MANDREL ELONGATION % | 31.3 | 15.8 |
| ACID ETCH TEST* 15' @ 50° C. | 2* | 2 |
| @ 60° C. | 4 | 4 |
| @ 75° C. | 5 | 5 |

*See page 18

EXAMPLE 11

Comparative Example Using a Polyurethane Polyol Without Hydrophobic Side Chains

A polyurethane polyol was prepared by self-condensing a bis(β-hydroxypropyl carbamate) of 2-methyl- 1,5-pentanediamine. 2811 parts by weight of above biscarbamate were charged into a suitable reaction vessel and catalyzed with 0.09 parts by weight of potassium hydroxide. The reaction mixture was heated to 180° C. Vacuum was applied at 145° C. and propylene glycol was distilled off. A sample was taken at a conversion corresponding to a dimer or a molecular weight of about 564. This material dissolved in 2-methoxypropyl acetate and had at a solids content of 85.3% and a viscosity of 14400 cps. The hydroxy content of the sample was 3.546 MEQ/g (milliequivalent) or a hydroxyl number of 198. This sample was designated A. The reaction was continued and a sample was taken at a conversion corresponding to a degree of polymerization of 3.07. This corresponds to a molecular weight of 822 and a hydroxyl content of 2.430 MEQ/g or a hydroxyl number of 136. This sample dissolved in 2-methoxypropyl acetate had a viscosity of 40400 cps at a solids of 89.1%. This sample was designated B.

EXAMPLE 11

A clear coat formulation No. 5 was prepared using the polyurethane polyol A according to Example 11 and described and evaluated in Table 4. This polyurethane was cross-linked with a commercially available HMMM cross-linker, Resimene 747 of Monsanto. The formulation was catalyzed with a dodecylbenzene sulfonic acid catalyst from King Industries.

TABLE 4

| | FORMULATION # 5 | |
|---|---|---|
| | WEIGHT % SOLIDS | CHARGE |
| Polyurethane A EXP. 11 | 73.57 | 117.23 |
| Resimine 747 (HMMM) | 25.43 | 35.28 |
| NACURE 5076 (DDBSA) | 1.00 | 1.94 |
| 2-Methoxypropyl acetate | — | 60.00 |
| Silicone Surfactant (10%) | — | 3 DROPS |
| TOTAL | 100.00 | 214.46 |
| RESULTS | | |
| SOLIDS % CALC | | 63.39 |
| VISCOSITY, CPS, 25° C. | — | 192 |
| SOLIDS 20' 150° C. | — | 59.8 |
| BONDERITE 1000, iron phosphate on cold rolled steel | | |
| CURE SCHED. 20 MIN, °C. | 125 | 150 |
| FILM TH. MIL | 1.00 | 1.00 |
| APPEARANCE | GOOD | GOOD |
| KNOOP HARDNESS | 23.0 | 29.0 |
| PENCIL HARDNESS | 2H-3H | >5H |
| IMPACT DIR IN. LB | 20–40 | 20–40 |
| REV IN. LB | 0–200 | 0–20 |
| CROSSHATCH ADH. % | 0 | 25 |

TABLE 4-continued

|  | FORMULATION # 5 | |
|---|---|---|
|  | WEIGHT % SOLIDS | CHARGE |
| MEK RUBS | 200 | 200 |
| ACID ETCH TEST* 15' @ 50° C. | 5 | 5 |
| @ 60° C. | 5 | 5 |
| @ 75° C. | 5 | 5 |

*See page 18

EXAMPLE 12

A clear coat formulation No. 6 was prepared using the polyurethane polyol B according to Example 11. Formulation No. 6 is described and evaluated in Table 5. This polyurethane was cross-linked with a commercially available HMMM cross-linker, Resimine 747 of Monsanto. The formulation was catalyzed with a dodecylbenzene sulfonic acid catalyst from King Industries. The cross-linking level in this formulation had been adjusted to account for the lower hydroxyl number of the polyol.

mixed methylate/butylated melamine cross-linker, Resimine 755 of Monsanto. This more hydrophobic cross-linker was reported to show improved acid etch resistance. The formulation was catalyzed with a dodecylbenzene sulfonic acid catalyst from King Industries. The cross-linking level in this formulation had been adjusted to account for the lower hydroxyl number of the polyol.

TABLE 5

|  | FORMULATION # 6 | |
|---|---|---|
|  | WEIGHT % SOLIDS | CHARGE |
| Polyurethane B EXP. 11 | 80.02 | 112.23 |
| Resimine 747 (HMMM) | 18.98 | 24.21 |
| NACURE 5076 (DDBSA) | 1.00 | 1.79 |
| 2-Methoxypropyl acetate | — | 60.00 |
| TOTAL | 100.00 | 198.23 |
| RESULTS |  |  |
| SOLIDS % CALC |  | 63.05 |
| VISCOSTY, CPS, 25° C. |  | 312 |
| SOLIDS 20' 150° C. |  | 60.2 |
| BONDERITE 1000, iron phosphate on cold rolled steel |  |  |
| CURE SCHED MIN, °C. | 120 | 150 |
| FILM TH. MIL | 1.00 | 1.00 |
| APPEARANCE | GOOD | GOOD |
| KNOOP HARDNESS | 23.0 | 27.0 |
| PENCIL HARDNESS | 2H-3H | 4H-5H |
| IMPACT DIR IN. LB | 20–40 | 20–40 |
| REV IN. LB | 0–20 | 0–20 |
| CROSSHATCH ADH. % | 100 | 80 |
| MEK RUBS | 200 | 200 |
| ACID ETCH TEST* 15' @ 50° C. | 5 | 5 |
| @ 60° C. | 5 | 5 |
| @ 75° C. | 5 | 5 |

See page 18

EXAMPLE 14

Clear coat formulation No. 7 was prepared using the polyurethane polyol A according to Example 11. This polyurethane was cross-linked with a commercially available

TABLE 6

|  | FORMULATION # 7 | |
|---|---|---|
|  | WEIGHT % SOLIDS | CHARGE |
| Polyurethane A EXP. 11 | 68.59 | 117.23 |
| Resimine 755 | 30.41 | 45.23 |
| NACURE 5076 (DDESA) | 1.0 | 2.08 |
| 2-Methoxypropyl acetate | 60.00 | — |
| TOTAL | 100.00 | 224.55 |
| RESULTS | | |
| SOLIDS 20' 125 C. | | 54.4 |
| VISCOSITY, CPS | 105 | |
| SOLIDS % CALC | 64.92 | |
| BONDERITE 1000, iron phosphate on cold rolled steel | | |
| CURE SCHED. 20 MIN | 150° C. | |
| FILM TH. MIL | 1.00 | |
| APPEARANCE | GLOSSY | |
| KNOOP HARDNESS | 34.00 | |
| PENCIL HARDNESS | 4H-5H | |
| IMPACT DIR IN. LB | 0-20 | |
| REV IN. LB | 0-20 | |
| CROSSHATCH ADH. % | 10 | |
| MEK RUBS | 200 | |
| ACID ETCH TEST* 15' @ 50° C. | 5 | |
| @ 60° C. | 5 | |
| @ 75° C. | 5 | |

See page 18

EXAMPLE 14

(Comparative Example) Polyester Urethane

A polyester urethane polyol was prepared by condensing cyclohexanedimethanol (5 mole), a blend of dimethylesters of succinic (DMS), glutaric (DMG) and adipic acid (DMA), (DMS 22%, DMG 62% and DMA 16%) (7 mole) and a bis, —β-hydroxypropyl carbamate of 2-methyl-1,5-pentane diamine (4.5 mole). The resulting product had a solids of 74.0% in xylene and a viscosity of 4000 cps at 25° C. The hydroxyl number of the resin solids was 109. This polyurethane was cross-linked with a commercially available HMMM cross-linker, Resimine 747 of Monsanto. The formulation was catalyzed with an amine blocked dodecylbenzene sulfonic acid catalyst from King Industries. The cross-linking level in this formulation had been adjusted to account for the lower hydroxyl number of the polyol. Formulation No. 8 using the polyester urethane of Example No. 15 is described and evaluated in Table 7.

TABLE 7

|  | FORMULATION # 8 | |
|---|---|---|
|  | WEIGHT % SOLIDS | CHARGE |
| Polyurethane polyol (Example 15) | 79.04 | 134.77 |
| Resimine 747 | 19.96 | 25.77 |
| 2-Methoxypropyl acetate | — | 15.00 |
| NACURE 5225 (DDBSA BL.) | 1.00 | 5.06 |
| TOTAL | 100.00 | 180.61 |
| RESULTS | | |
| SOLIDS % CALC | — | 70.06 |
| VISCOSITY, CPS | — | 302 |
| BONDERITE 1000 iron phosphate on cold rolled steel | | |
| CURE SCHED 20 MIN | 120° C. | 150° C. |
| FILM TH. MEL | 0.80 | 0.80 |
| APPEARANCE | GLOSSY | GLOSSY |

TABLE 7-continued

| | FORMULATION # 8 | |
|---|---|---|
| | WEIGHT % SOLIDS | CHARGE |
| KNOOP HARDNESS | 1.8 | 3.5 |
| PENCIL HARDNESS | HB-F | HB-F |
| IMPACT DIR IN. LB | 160 | 160 |
| REV IN. LB | 160 | 160 |
| CROSSHATCH ADH. % | 10 | 5 |
| MEK RUBS | 50 | 110 |
| MANDREL ELONGATION % | 31.3 | 31.3 |
| ACID ETCH TEST* 15' @ 50° C. | 1 | 0 |
| @ 60° C. | 4 | 3 |
| @ 75° C. | 5 | 4 |

*See page 18

EXAMPLE 16

(Preparation of an Urea and Urethane Group Containing Polyurethane Polyol)

403 parts by weight of trimethylolpropane (3 mole) and 432 parts by weight of a isodecyloxypropylamine (1.8 mole) were blended with 1440 parts by weight of bis(hydroxypropyl) carbamate of 2-methyl-1,5pentanediamine. This blend was catalyzed with 0.3 gram of potassium hydroxide. The mixture was heated in a suitable reactor equipped with a nitrogen inlet and agitator to 150C. The temperature was slowly raised to 165C. The amine content of the reaction mix was measured. Initial titration gave a MEQ/g of 0.88, after a reaction time of 5 hours at 165° C., the MEQ/g dropped to >0.9. Vacuum was slowly applied to the reactor and full vacuum was slowly applied. A partial condenser was used to recycle any unreacted amine. Propylene glycol was collected as a distillate. 582 grams of distillate were collected, predominately propylene glycol. Amine titration of the final resin shows the resin to be essentially amine free. The resin was cooled to 130° C. and diluted with 520 parts by weight of xylene. Example 16 is described, evaluated and used in Formulation Nos. 9 and 10, in Table 8.

TABLE 8

| | FORMULATION | | | |
|---|---|---|---|---|
| | 9 | | 10 | |
| | WEIGHT % SOLIDS | CHARGE | WEIGHT % SOLIDS | CHARGE |
| Resime 747 (HMMM) | 20.00 | 12.92 | 15.00 | 9.11 |
| DodecylbenzeneSulfonic Acid (70%) | 1.00 | 0.90 | 1.00 | 0.95 |
| 2-Methoxypropanol | | 20.00 | | 20.00 |
| TOTAL | 100.00 | 100.00 | 100.00 | 96.63 |
| RESULTS | | | | |
| VISCOSITY, CPS 25° C. | | 703 | | |
| BONDERITE 1000, iron phosphate on cold rolled steel | | | | |
| CURE SCHEDULE 20 MIN, °C. | 120 | 150 | 120 | 150 |
| FILM THICKNESS, MIL/MICRON | 1/25 | 1/25 | 1/25 | 1/25 |
| RESIN EXAMPLE 16 | 79.00 | 66.67 | 84.00 | 66.67 |
| APPEARANCE | GLOSSY | GLOSSY | GLOSSY | GLOSSY |
| KNOOP HARDNESS | 4.0 | 15.8 | 1.8 | 12.5 |
| PENCIL HARDNESS | F-H | 2H-3H | 3B-2B | H-2H |
| ADHESION, % | 100 | 100 | 100 | 0 |
| MEK DRUBS | 40 | 200 | 15 | 200 |
| IMPACT DIRECT, inch. lbs. | 160 | 40–60 | 100–120 | 40–60 |
| IMPACT REVERSE, inch. lbs. | 160 | 0–20 | 40–60 | 20–40 |
| HUMIDITY, CLEVAND, 65° C. | | 9VF* | | 9VF* |
| 1000 HRS HARDNESS | | 2H-3H | | 2H-3H |
| ACID ETCH TEST* 15' @ 50° C. | 2 | 1 | | 2 |
| @ 60° C. | 5 | 2 | | 3 |
| @ 75° C. | 5 | 5 | | 5 |

*Blister very few (VF), blister size ASTM ratio small (<0.5 mm)
**See page 18

EXAMPLE 16 (water-dispersible)

403 parts by weight of trimethylolpropane and 862 parts by weight of the hydroxypropyl carbamate of isodecyloxypropylamine (2.5 mole) and 800 parts by weight of the bis(hydroxypropyl carbamate) of 2-methyl-1,5-pentanediamine were charged to a suitable reactor and heated to 150° C. in the presence of 0.2 gram of potassium hydroxide catalyst. Vacuum was slowly applied and propylene glycol was removed as a reactant. About 460 parts of distillate was collected as the temperature was slowly increased to 170° C. The final resin had a viscosity of 40 Poise at 100° C. 100 parts by weight of succinic anhydride were added to this reaction mixture and the mixture was held at 100° C. for about two hours. The resin was then dispersed in water in the presence of dimethylaminoethanol.

The water-dispersed polyurethane resin was formulated with HMMM cross-linker as showed in Example 16 and cured at 150° C. The resin was 100% neutralized with dimethylethanolamine and dispersed hot in the absence of any solvent. The acid etch results were 1, 2 and 5 respectively at 50°, 60° and 75° C.

Figure 2:
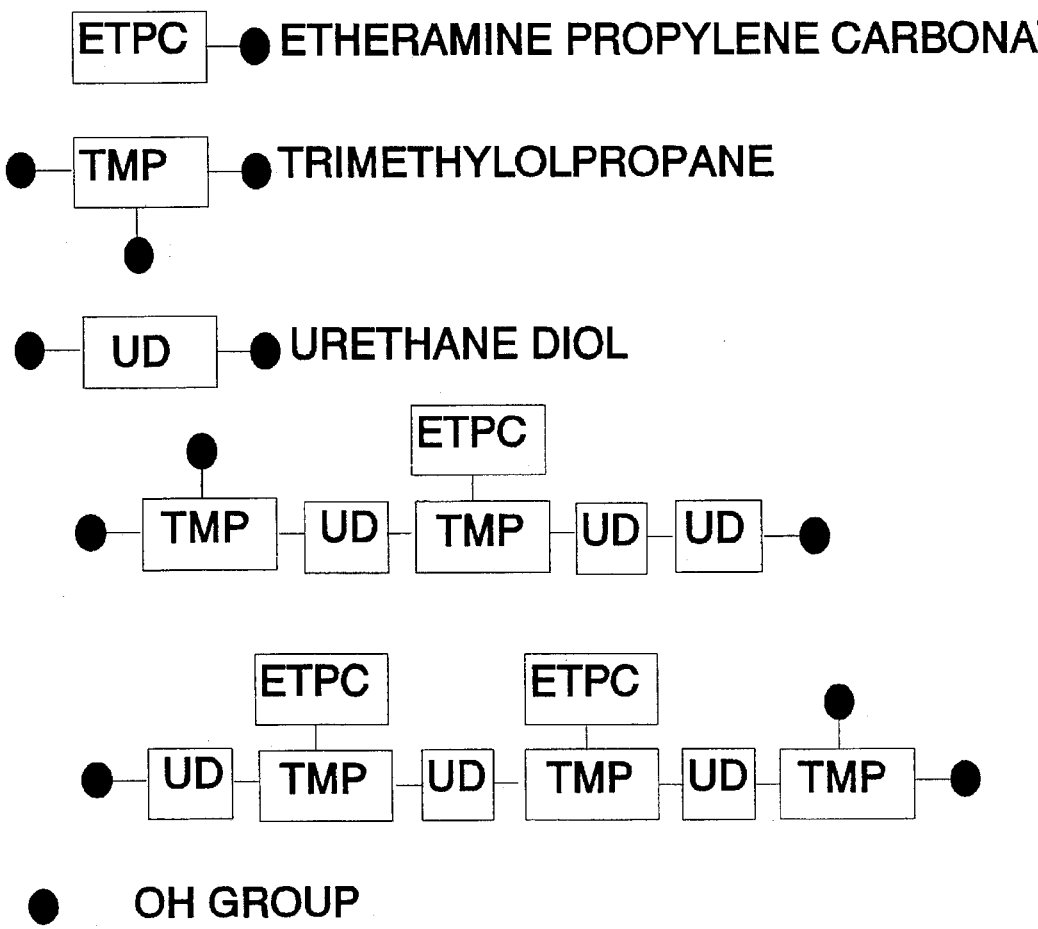
FIG. 2 shows the type of monomeric units that can be formed from etheramine, propylene carbonate, trimethylol propane and a urethane diol.
Figure 3:
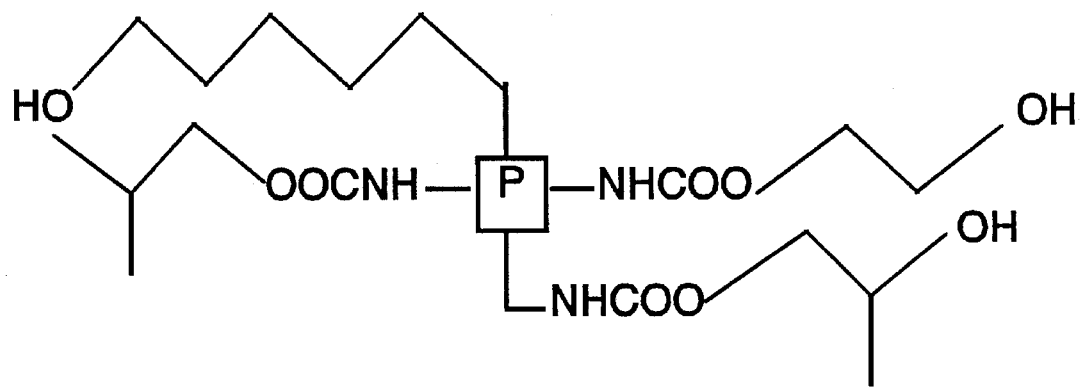
FIG. 3 is a generic formula of the polymer formed from the monomers of FIG. 2.

FIG. 2 shows non-limiting examples of polymer chains in schematic with form from units such as, etheramine propylene carbonate, trimethylol propane urethane diol and, hydroxyl groups. FIG. 3 shows a polymer derived from a urethane diol, a polyol and an etheramine propylene carbamate.

Although the invention has been described in conjunction with the specific embodiments, it is evident that many alternatives and variations will be apparent to those skilled in the art in light of the foregoing description. Accordingly, the invention is intended to embrace all of the alternatives and variations that fall within the spirit and scope of the appended claims. Further, the subject matter of the above cited United States Patents are incorporated herein by reference.

I claim:

1. A polymer having the formula

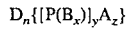

wherein D is an OH group, a carboxyalkylester or carboxyarylester group obtained by the reaction of an OH group with a $C_4$ to $C_{20}$ acyclic aliphatic or $C_4$ to $C_{20}$ cycloaliphatic anhydride or a $C_8$ aromatic anhydride, or a combination of an OH group and the above defined carboxyalkyester or carboxyarylester groups;

n is at least 2;

P is a $C_2$-$C_{10}$ aliphatic or $C_3$-$C_{10}$ cycloaliphatic moiety and is derived from a diol or polyol;

B is a di or tri functional aliphatic or cycloaliphatic moiety and is derived from a diol or polyol;

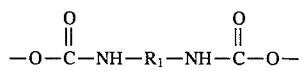

or

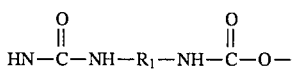

or

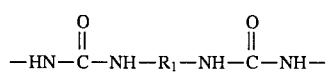

wherein $R_1$ is $C_2$ to $C_{18}$ and derived from the reaction with a polyhydroxyalkyl carbamate;

A is defined as,

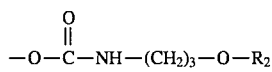

wherein $R_2$ is a $C_6$ to $C_{18}$ aliphatic linear or branched alkyl group derived from the reaction product of an amine with a cyclic carbonate, or

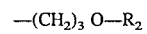

wherein $R_2$ is a $C_6$ to $C_{18}$ aliphatic linear or branched alkyl group derived from an etheramine, and optionally at least a portion of the above etheramine can be replaced with A' defined as

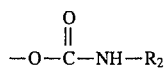

wherein $R_2$ is a $C_6$ to $C_{18}$ aliphatic linear or branched alkyl group derived from the reaction product of an amine and a cyclic carbonate, or a $C_6$ to $C_{18}$ aliphatic linear or branched alkyl group derived from an amine;

x is a number between 1 to 10; y is a number between 0 to 10; and z is a number between 1 to 10.

2. The polymer according to claim 1, wherein n is between 3 and 10.

3. The polymer according to claim 1, wherein said polymer has a carboxyl content of about 0.5 to about 1.5 MEQ/g of polymer.

4. A polyurethane polymer prepared from: (1) at least one polyol having at least one hydrophobic side chain per molecule that contains after reaction one ether group having a $C_6$ to $C_{18}$ alkyl side group per chain; (2) a mono or poly hydroxy alkylcarbamate and, (3) a fully alkylated hexamethylol melamine oligomer thereof or methylated/butylated resin, in the presence of a strong sulfonated catalyst.

5. The polymer according to claim 4, where said polyol is selected from the group consisting of trimethylolpropane, trimethylolethane, pentaerythritol, glycerine and mixtures thereof.

6. A process of preparing polyurethane polyol polymer comprising:

reacting a diol or at least one polyol with a poly (hydroxyalkyl carbamate) of an aliphatic or cycloaliphatic amine or a monohydroxyalkyl carbamate of an alkoxypropylamine or an alkoxypropylamine to form a polyurethane polyol, and reacting the polyurethane polyol and a melamine cross-linker with a catalyst to form the polyurethane polyol polymer, wherein said diol or at least one a polyol contains on the average at least one hydrophobic side chain per molecule that contains after reaction one ether group having a $C_6$ to $C_{18}$ alkyl side group per chain.

7. The process of claim 6, wherein said catalyst is selected from the group consisting of p-toluenesulfonic acid or dodecylbezene sulfonic acid, dinonylnaphthalene disulfonic acid or the amine salts of these acids.

8. The process according to claim 6, wherein a polyol is reacted and is selected from the group consisting of trimethylolpropane, trimethylolethane, pentaerythritol, glycerine and mixtures thereof.

9. A process of preparing polyurethane polyols comprising:

reacting a blend of $C_6$-$C_{10}$ n-alkoxypropylamines with a propylene carbonate at sufficient temperature and pressure until the amine content drops to below 0.15 milliequivalent per gram (MEQ) to form a mono carbamate, reacting the thus formed monocarbamate with a polyol at elevated temperature to form a reaction mixture, admixing and reacting bis-hydroxypropyl carbamate of 2-methyl-1,5-pentanediamine with said reaction mixture to form a polyurethane polyol having alkyl side chains that have an in-line ether group having a $C_6$ to $C_{18}$ alkyl side group.

10. A polyurethane polyol polymer prepared from the reaction of:
   (1) a diol or at least one polyol having at least one hydrophobic side chain per molecule that contains one ether group per chain or;
   (2) a poly(hydroxyalkyl carbamate) of an aliphatic or cycloaliphatic amine or, a monohydroxyalkyl carbamate of an alkoxypropylamine or an alkoxypropylamine;
   (3) a melamine cross-linker; and
   (4) a sulfonic acid catalyst form to produce a polyurethane polymer, wherein said diol or at least one polyol contains on the average at least one hydrophobic side chain per molecule that contains after reaction one ether group having a $C_6$ to $C_{18}$ alkyl side group per chain.

11. The polymer according to claim 10, wherein a polyol is used and is selected from the group consisting of trimethylolpropane, trimethylolethane, pentaerythritol, glycerine and mixtures thereof.

12. A process of preparing polyurethane polyols comprising: reacting a diol or at least one polyol with a poly(hydroxyalkyl carbamate) of an aliphatic or cycloaliphatic amine and a monohydroxyalkyl carbamate of an alkoxypropylamine or an alkoxypropylamine to form a polyurethane polyol, wherein said at least one a polyol contains on the average at least one hydrophobic side chain per molecule that contains after reaction one ether group having a terminal $C_6$ to $C_{18}$ alkyl side group per chain.

* * * * *

UNITED STATES PATENT AND TRADEMARK OFFICE
CERTIFICATE OF CORRECTION

PATENT NO. : 5,565,531
DATED : OCTOBER 15, 1996
INVENTOR(S) : Werner J. Blank

Page 1 of 3

It is certified that error appears in the above-identified patent and that said Letters Patent is hereby corrected as shown below:

Figure 1, delete,

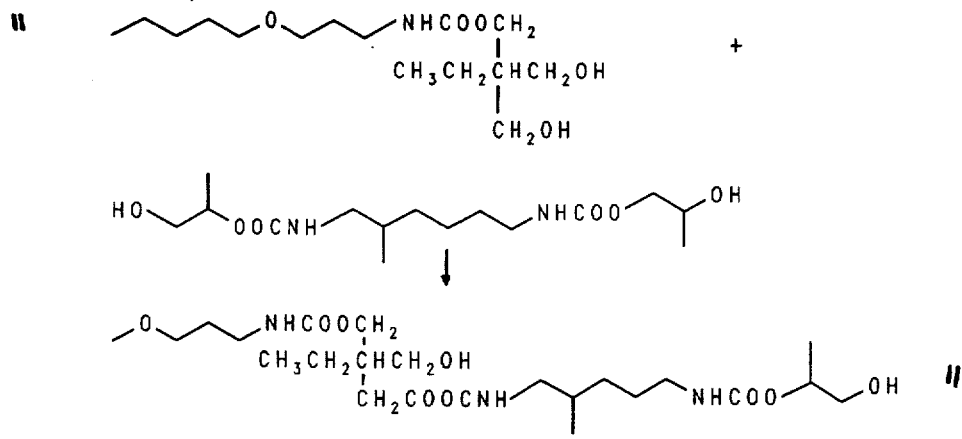

and insert,

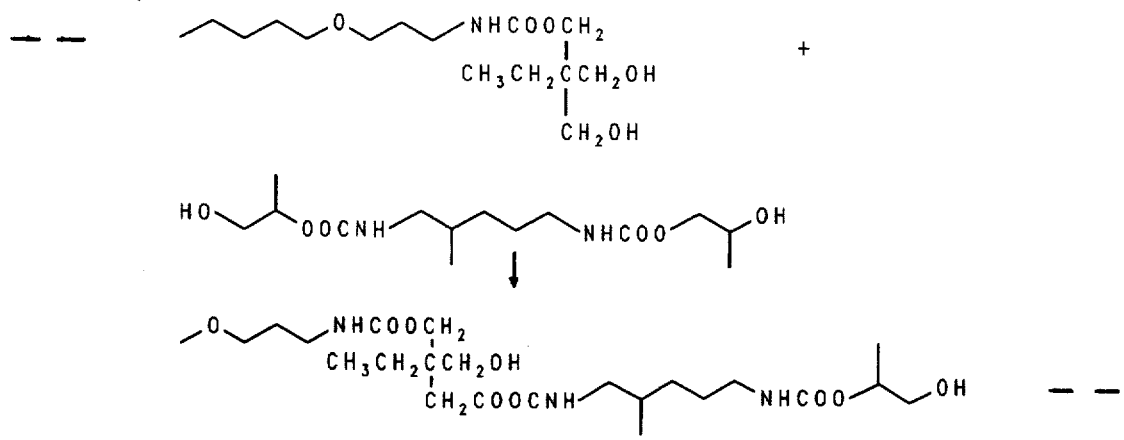

UNITED STATES PATENT AND TRADEMARK OFFICE
CERTIFICATE OF CORRECTION

PATENT NO. : 5,565,531
DATED : OCTOBER 15, 1996
INVENTOR(S) : Werner J. Blank

It is certified that error appears in the above-identified patent and that said Letters Patent is hereby corrected as shown below:

Column 7, line 10-13, delete,

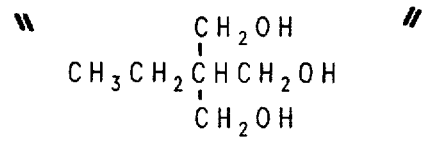

and substitute,

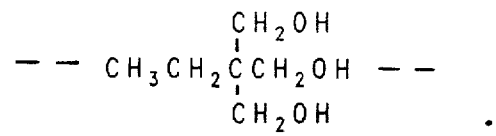

UNITED STATES PATENT AND TRADEMARK OFFICE
CERTIFICATE OF CORRECTION

PATENT NO. : 5,565,531
DATED : October 15, 1996
INVENTOR(S) : Werner J. Bank

It is certified that error appears in the above-identified patent and that said Letters Patent is hereby corrected as shown below:

Column 7, lines 17-21, delete

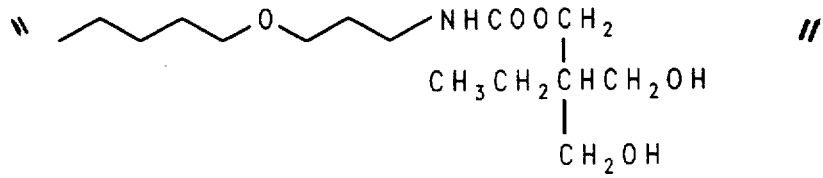

and insert,

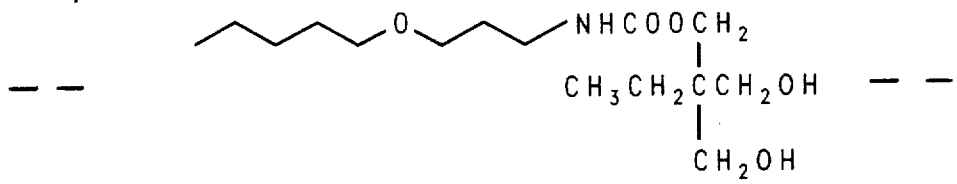

Signed and Sealed this

Twenty-eighth Day of April, 1998

*Attest:*

BRUCE LEHMAN

*Attesting Officer*  Commissioner of Patents and Trademarks